US008231035B1

(12) United States Patent
Michael et al.

(10) Patent No.: US 8,231,035 B1
(45) Date of Patent: Jul. 31, 2012

(54) HITCH BALL ASSEMBLY HOLDER

(75) Inventors: Russell W. Michael, Indianapolis, IN (US); James V. Rendaci, Indianapolis, IN (US)

(73) Assignee: JRM International Products, Inc., Indianapolis, IN (US)

( * ) Notice: Subject to any disclaimer, the term of this patent is extended or adjusted under 35 U.S.C. 154(b) by 249 days.

(21) Appl. No.: 12/802,891

(22) Filed: Jun. 17, 2010

(51) Int. Cl.
*B60R 7/00* (2006.01)

(52) U.S. Cl. ........................................ 224/403; 224/557

(58) Field of Classification Search .......... 224/403–405, 224/519–521, 547, 555, 557, 571; 280/491.1, 280/491.2, 491.5, 504, 507, 511; 248/228.1, 248/227.4, 227.2, 223.41, 224.51, 224.61, 248/224.7, 225.11
See application file for complete search history.

(56) References Cited

U.S. PATENT DOCUMENTS

| | | | | |
|---|---|---|---|---|
| 5,007,568 | A | 4/1991 | Da Vault | |
| 5,431,425 | A * | 7/1995 | Klinkman | 280/491.1 |
| 5,476,279 | A * | 12/1995 | Klemetsen | 280/415.1 |
| 6,125,945 | A | 10/2000 | Skaggs et al. | |
| 6,234,512 | B1 * | 5/2001 | Bettenhausen | 280/491.1 |
| 6,378,819 | B1 * | 4/2002 | Johnson | 248/214 |
| 6,474,522 | B1 * | 11/2002 | Johnson | 224/515 |
| 6,527,292 | B2 | 3/2003 | Adair | |
| 6,832,709 | B2 * | 12/2004 | Henry | 224/403 |
| 7,055,844 | B1 * | 6/2006 | Bostedt | 280/491.5 |
| 7,258,359 | B2 | 8/2007 | Wooten | |
| 8,079,611 | B2 * | 12/2011 | Schroeder | 280/491.5 |
| 8,136,663 | B2 * | 3/2012 | Foster | 206/488 |
| 2002/0017770 | A1 | 2/2002 | Parrish | |
| 2003/0057676 | A1 | 3/2003 | Griggs | |
| 2004/0150205 | A1 * | 8/2004 | DeAnda | 280/769 |
| 2006/0220347 | A1 | 10/2006 | Witchey | |
| 2008/0251556 | A1 * | 10/2008 | Ayers | 224/521 |
| 2010/0314899 | A1 * | 12/2010 | Slacks | 296/37.6 |

* cited by examiner

*Primary Examiner* — Nathan J Newhouse
*Assistant Examiner* — Todd Anderson
(74) *Attorney, Agent, or Firm* — The Marbury Law Group, PLLC

(57) ABSTRACT

A unit for storing a trailer hitch on a vehicle includes a tubular housing which is shaped to slidably accommodate the support bar of the hitch ball mount. One side wall of the housing includes a plurality of walls that are arranged to define a channel that extend from one end of the housing to a location that is spaced apart from the other end of the housing. Mounting fastener accommodating holes are defined through one of the channel-defining walls, and a hole is defined through one wall of the housing to be aligned with the mounting fastener accommodating holes so a tool can be inserted into the housing to set fasteners with the channel spacing those set fasteners apart from the support bar. Aligned receiver accommodating holes are defined through sidewalls of the housing so a hitch receiver pin can extend through these holes and through a corresponding receiver-accommodating hole in the bar of the hitch ball mount to attach the hitch mount to the housing for storage. The hitch ball mounting end of the hitch mount extends out of one end of the housing during storage.

8 Claims, 3 Drawing Sheets

HITCH BALL ASSEMBLY HOLDER

CROSS REFERENCE TO RELATED APPLICATION

The present application claims priority of the filing date of Jun. 10, 2009 of provisional application Ser. No. 61/268,185.

TECHNICAL FIELD OF THE INVENTION

The present invention relates to the general art of motor vehicle accessories, and to the particular field of towing/trailer hitch devices.

BACKGROUND OF THE INVENTION

Tow hitch assemblies are commonly used to attach one vehicle with another vehicle whereby one vehicle can tow another. The towing vehicle can be an automobile, an SUV, a truck or the like, or a motorcycle and the towed vehicle can be a cart, a boat trailer or the like. The use of ball hitches are well known for towing various types of trailers from common road vehicles. Typical ball hitches include a receiver which is mounted on a frame of the vehicle by bolting or welding and a ball mount which is selectively, slidably mounted within the receiver. The ball mount generally comprises a ball supported on a flat bar welded to a stem in which the stem is arranged to be slidably received within the receiver fixed on the vehicle. The stem may comprise a square tube or bar which is usually 2 inches by 2 inches in outer dimensions in cross section. A suitable locking pin is received within co-operating apertures in both the receiver and the stem of the ball mount for locking the ball mount within the receiver. Common sizes of ball hitches include 1⅞ inches, 2 inches and 2$\frac{5}{16}$ inches in outer diameter, however other sizes are also known. In general, the different sizes of balls for ball hitches are provided mounted on their own respective stems so that the receiver only mounts one of the ball mounts therein at a given time.

The trailer hitch thus comprises of two parts; the receiver which is rigidly attached to the vehicle and the hitch ball assembly which is removable from the receiver. Trailer hitches with removable ball assemblies come in numerous classes (Class I-V), sizes and designs. Due to this fact, it is often necessary to have more than one hitch ball assembly to accommodate these different applications. When not in use, a hitch ball assembly must be stored, and since only one assembly at a time will be in use, the typical situation requires storage of one or more hitch ball assemblies. Even when only one size of a ball hitch is required by a particular individual, it is typically recommended for safety and security to remove the ball mount from the receiver when not in use and thus proper storage of the ball mount is still required.

Trailer hitches are designed to allow maneuverability of the vehicle and trailer. This maneuverability creates the necessity for the hitch ball assembly to extend from the rear of the vehicle. This extension allows the required clearance to avoid interference/contact between the vehicle and trailer when turning and or towing.

When not in use, hitch ball assembly storage becomes an issue as it should be properly stored. There are basically three choices for storage. First would be to leave the hitch ball assembly in the receiver of the vehicle. This can cause problems when backing up and or parallel parking. In this position it can also create a safety hazard by being at a height to injure the legs if someone walks by and the hitch ball assembly goes unnoticed. The second choice would be to store the hitch ball assembly loose in the pickup bed, trunk and or cargo area of the vehicle. Basic laws of physics quickly come into play in these scenarios through inertia. Extreme acceleration, braking or turning causes it to become a projectile as it moves freely about. Due to the weight of the hitch ball assembly, this can cause serious damage to the pickup bed, trunk or cargo area of the vehicle. Also because it is unsecured, this makes it much more prone to theft. Furthermore, trailer hitch balls by their very nature require greasing and become extremely dirty during normal use and their storage in vehicles when not being used can be a very dirty and regretful situation. Driver's hands and clothes easily become irreversibly stained and soiled, and the inside of the vehicle also becomes stained and soiled. The third choice would be to store the hitch ball assembly at the home, business, garage, on a trailer, etc. Options could include the floor, workbench, shelf, closet, etc. This would create an eyesore in addition to the fact that it would take up valuable storage space. If the hitch ball assembly were to be left on the floor, it could become a safety hazard by someone tripping over it.

Of late, especially for use in conjunction with deluxe pickup trucks, rear bumpers are provided which are highly chromed for pleasing appearance. To maintain the pleasing appearance of the rear portion of the vehicle structure, hidden trailer hitches have been provided which are mounted to the frame structure of the vehicle and provide a trailer hitch receiver that is exposed through a license plate opening in the bumper. Thus, when use of the trailer hitch is desired the license plate holder is simply pivoted upwardly or downwardly to an out of the way position and the hitch bar is inserted into the receiver and secured with its retainer pin. When a trailer hitch of this character is installed the receiver is typically fixed centrally of a transverse hitch strut having its extremities bolted or otherwise secured to the vehicle frame.

It would be very helpful if such aesthetically pleasing accessories could use a readily available trailer hitch assembly. This might be accomplished by mounting the hitch assembly in a manner which allows efficient and easy removal of the hitch assembly when that assembly is not in use.

Therefore, there is a need for a device for securely stowing one or more hitch assemblies on a vehicle in order to protect them from theft and prevent them from damaging the vehicle and any cargo. Ideally, the device should be relatively inexpensive, simple to use, and simple to install with minimal alterations to the vehicle required. In addition, the device should be unobtrusive and should produce only minimal interference with the cargo carrying capability of the vehicle.

Furthermore, since one of the objects of storing a hitch ball assembly is to protect it from damage or marring, the unit used to store the hitch ball assembly should do so in a manner which is secure as well as safe for the hitch ball assembly. The hitch ball assembly should thus be stored in a manner which is secure yet easily and quickly effected and in a manner which does not expose the hitch ball assembly to marring due to contact with elements of the storing unit.

Still further, since the hitch ball assembly storing unit may be subject to hard usage and/or contact with cargo during storage of the hitch ball assembly, the storing unit should be designed to withstand such hard usage and/or contact with cargo without being marred or damaged, and certainly, without transmitting such contact or hard usage to the hitch ball assembly being stored.

Accordingly, there is a need for a hitch ball assembly storing unit that is easy to install, easy to use, will not damage or mar the hitch ball assembly and will store that hitch ball assembly in a manner which protects that assembly from damage or marring due to hard use and/or contact with cargo or other elements.

SUMMARY OF THE INVENTION

These, and other, objects are achieved by a hitch ball assembly storage unit which is used to hold and store a hitch ball mount when that mount is not in use to prevent the hitch ball mount from being lost or stolen or from moving during vehicle movement. The device can be mounted to the vehicle or to any other mount and includes a tubular housing which is shaped to slidably accommodate the support bar of the hitch ball mount while also protecting the hitch ball assembly from marring or damage during storage. Wall portions of the housing are arranged to define a channel and mounting fasteners are accommodated in one of the channel-defining walls to be spaced apart from the hitch assembly support bar during storage in the housing. A hitch ball assembly receiving pin-accommodating hole is defined through one wall of the tubular housing and the receiving pin of the hitch ball assembly is accommodated through that hole and through a corresponding hole in the hitch mount shaft and through a further corresponding hole defined in another wall of the housing which is aligned with the first-mentioned hole to securely fasten the hitch mount to the holder device with the hitch ball mounting end of the hitch mount extending out of one end of the holding unit. Further holes are defined through one wall of the housing so a tool can be inserted through the housing to fasten the mounting fasteners to a support. The housing can also have further receiver pin accommodating holes defined through other walls thereof whereby a hitch ball assembly can be oriented in various orientations and still be accommodated in the housing.

The housing is shaped so it can be securely mounted on a mounting surface, such as the side of a vehicle cargo hold, yet will not mar or damage the receiver pin.

BRIEF DESCRIPTION OF THE DRAWING FIGURES

DETAILED DESCRIPTION OF THE PREFERRED EMBODIMENT OF THE INVENTION

Figure 1:
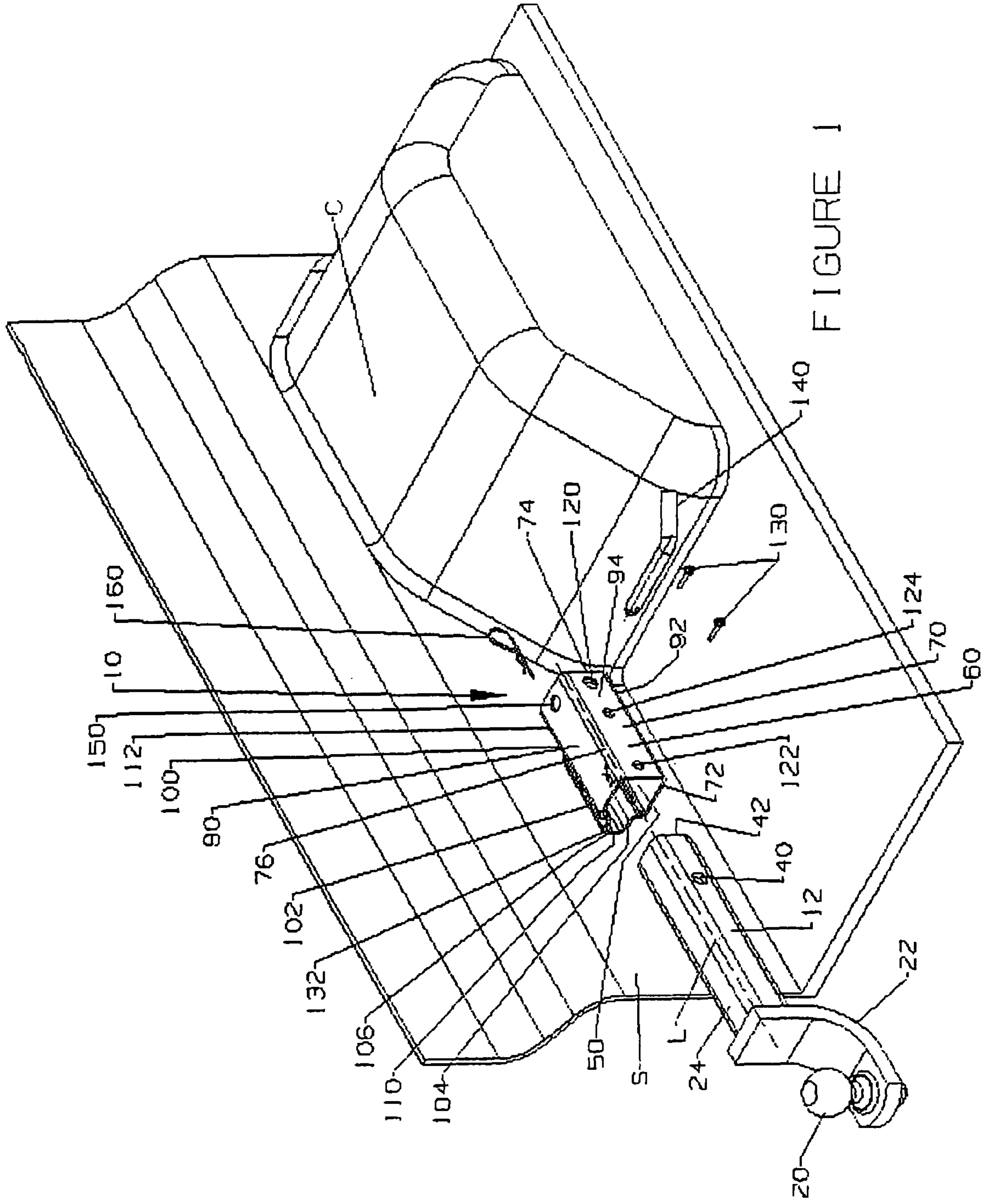
FIG. 1 is a perspective view of the hitch ball assembly storage unit embodying the principals of the present invention, with the hitch ball assembly in a horizontal orientation in a storage area of a motor vehicle.

Other objects, features and advantages of the invention will become apparent from a consideration of the following detailed description and the accompanying drawings.

Referring to the figures, it can be understood that the present invention is embodied in a storage unit 10 in which a hitch ball assembly 12 is stored when that hitch ball assembly is not in use. The unit can be located in a cargo area of a pickup truck adjacent to a wheelwell C. However, as will be understood by those skilled in the art, the unit can be located anywhere and the showing of a cargo area and a wheelwell are not intended to be limiting. As shown, hitch assembly 12 includes a hitch ball 20 unitarily mounted on a distal end 22 of a support bar 24 and which is used to attach a towing vehicle to a towed vehicle in a manner well known in the art. As discussed above, when not mounted on the vehicle in a towing condition, assembly 12 may create problems if it is not properly stored. The storage unit achieves the result of properly storing assembly 12 when that assembly is not in a towing condition on the vehicle.

As shown in the figures, support bar 24 has a receiver pin accommodating hole 40 defined transversely of the longitudinal axis L thereof and located near proximal end 42 thereof. Support bar 24 is slidably received in a bore 50 of housing 60 during storage. Housing 60 includes a tubular body 70 having a first end 72, a second end 74 and a longitudinal axis 76 which extends between ends 72 and 74. Bore 50 extends between ends 72 and 74 in the direction of the longitudinal axis and is sized to slidably accommodate support bar 24, and the longitudinal axes L and 76 are linearly aligned when the storage unit is in use. Housing 60 further includes a first side wall 90, a second side wall 92 and a third side wall 94 which connects side walls 90 and 92. A fourth side wall 100 also connects side walls 90 and 92 and is in facing relationship with side wall 94. Side wall 100 includes a first wall 102, a second wall 104 and a third wall 106 which connects the first and second walls 102 and 104 together. Each of the walls 102 and 104 has a first end 102' and 104' respectively which is located in a plane containing the first end 72 of housing 70 and a second end 19 which is spaced apart from second end 74 of housing 70 in the direction of longitudinal axis 76. Walls 102 and 104 are essentially parallel with each other and are spaced apart from each other so that the walls 102, 104, 106, and 106 define a channel 110 that is located to open into bore 50 as can be seen in FIG. 1. As can be seen in the figures, especially FIG. 2, side wall 100 also includes a fifth wall portion 112. The channel shape of side wall 100 spaces body 70 apart from side wall 106 for a purpose that will be understood from the teaching of this disclosure. The channel shape of side wall 100 also does not extend for the full longitudinal extent of the housing so there is spacing between the channel and end 74 of the housing. This structure spaces side wall portion 112 from a supporting structure for a purpose that will be understood from the teaching of this disclosure.

As can be understood from the figures, side wall 94 has a receiver pin accommodating hole 120 defined therethrough to open into bore 50 as well as two fastener accommodating holes 122 and 124 which are also defined through side wall 94 to open into bore 50. Mounting fasteners, such as screws 130, mount housing 60 to a support and extend through side wall 106 via fastener-receiving holes, such as hole 132 shown in FIG. 1. Holes 122 and 124 are used to accommodate a fastener driver, such as a screwdriver, so that driver can drive the fasteners through side wall 106 and into the associated support. Receiver pin accommodating hole 120 is aligned with a receiver pin accommodating hole 126 defined through wall portion 112 for a purpose which will be understood from the teaching of this disclosure.

When support bar 24 is accommodated in bore 50, receiver pin accommodating hole 40 in the support bar is aligned with aligned receiver pin accommodating holes 120 and 126 in the housing so that a receiver pin 140 will be accommodated in these aligned holes and will attach the support bar to the housing. A cotter pin 160 further attaches the support bar to the housing to ensure that support bar does not become detached from the housing.

Housing 70 further includes two stiffening ribs, 180 and 182, which attach the first wall 102 to fourth side wall 100 and second wall 104 to fourth side wall 100.

The channel shape of side wall 100 spaced body 70 apart from side wall 106 so mounting screws, such as screws 130, used to mount housing 70 to a support structure will not contact hitch assembly 12 when it is stored in housing 70. This spacing protects the hitch assembly from damage or marring due to contact with the mounting elements. Furthermore, the housing structure discussed above spaces side wall portion 112 away from a supporting structure to allow room to accommodate a receiver pin as that pin extends completely through the housing and is in contact with two walls of the housing, walls 94 and 112, whereby a secure attachment of the hitch ball assembly to the housing is effected. Still further, the shape of wall 100 allows housing 70 to be manufactured without an excess of material thereby keeping manufacturing costs at a minimum. Still further, the channel shape of wall 100 keeps the housing strong so it will not deform during use. If the housing is impacted by cargo or the like, the shape of wall 100 is not likely to be deformed. Deformation of the housing may make it difficult, if not impossible, to securely and efficiently store a hitch assembly in the holder. Still further, the shape of wall 100 makes it possible to located mounting fasteners in close proximity to the stored hitch assembly thereby contributing to the secure nature of the storage. If the mounting fasteners are located spaced apart from the hitch assembly, there is a possibility that the overall string assembly can loosen or be deformed thereby vitiating the purposes of the storing assembly.

Figure 2:
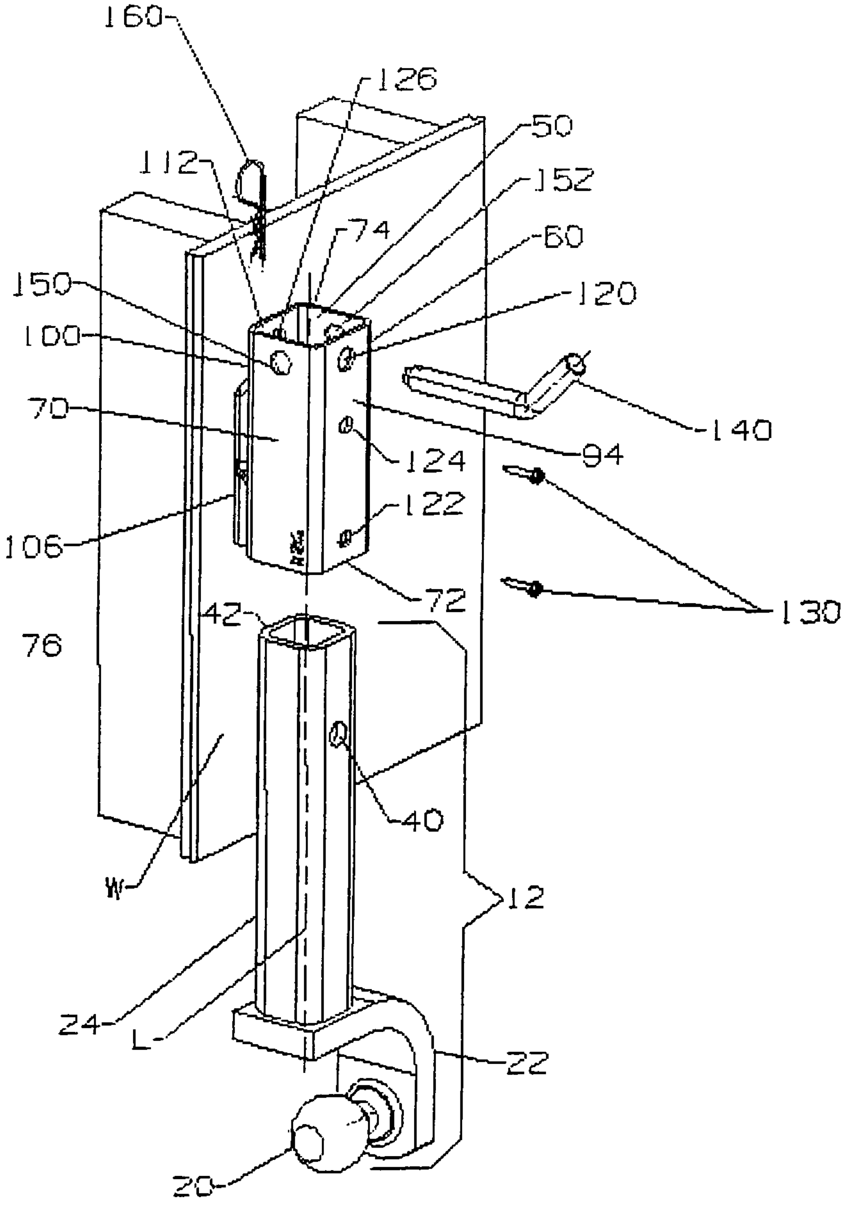
FIG. 2 is a perspective view of the hitch ball assembly storage unit embodying the principals of the present invention, with the hitch ball assembly in a vertical orientation on a vertical support structure.
Figure 3:
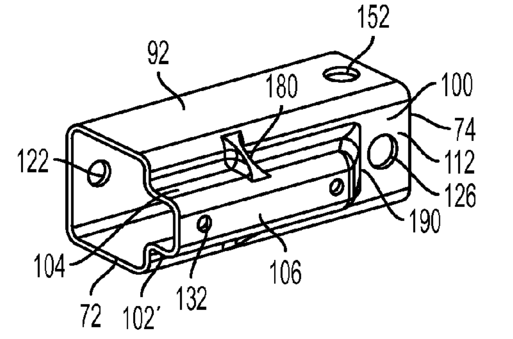
FIG. 3 is a perspective side view of the housing of the storage unit.
Figure 4:
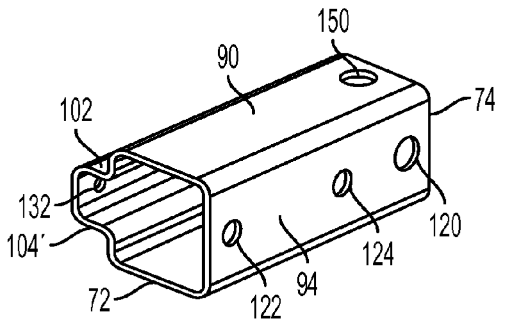
FIG. 4 is a perspective side view of the housing of the storage unit as seen from the side opposite to the side shown in FIG. 3.
Figure 5A:
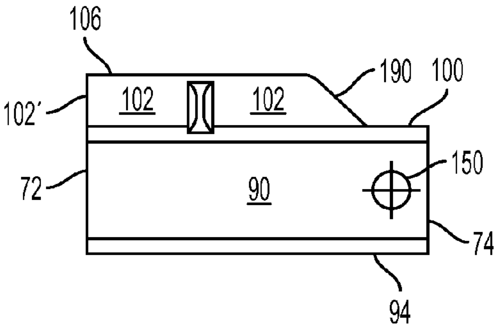
FIG. 5A is an end view of the housing.
Figure 5B:
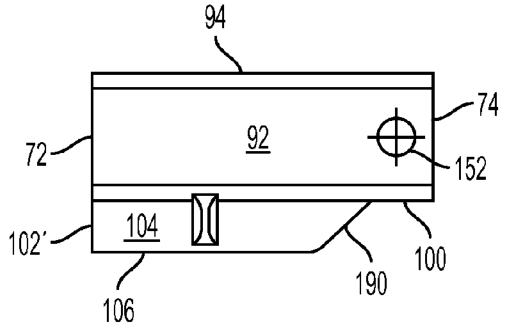
FIG. 5B is an end view of the housing.
Figure 5C:
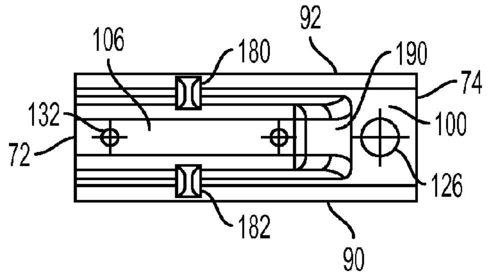
FIG. 5C is a bottom view of the housing showing the side opposite the side shown in FIG. 4.
Figure 5D:
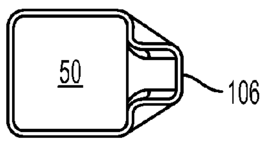
FIG. 5D is an end elevational view of the housing.
Figure 5E:
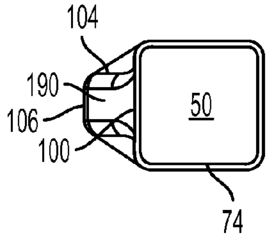
FIG. 5E is an end elevational view of the housing as seen from the end opposite the end shown in FIG. 5D.

As can be understood from the figures, storage unit 10 can be located wherever it is most convenient. For example, the storage unit can be located in the cargo area C of a truck as shown in FIG. 1 and mounted on a sidewall S of the truck cargo area, or the storage unit can be mounted on a wall W in a storage area, such as in a garage or the like. As can also be understood from the figures, the storage unit can be oriented in a horizontal orientation such as shown in FIG. 1, or in a vertical orientation such as shown in FIG. 2. As will occur to one skilled in the art based on the teaching of this disclosure, the storage unit can be vertical in a motor vehicle or horizontal on a wall. Of course, the storage unit need not be exactly horizontal or exactly vertical, but can be oriented at an oblique angle with respect to either vertical or horizontal as suitable.

Storage unit 10 can be made of lightweight plastic, metal or any other material suitable to the purpose of the storage unit and can be mounted on any surface material. The channel shape of side wall 100 spaces tubular body 70 of housing 60 away from the supporting surface to space a stored hitch ball assembly 12 away from the supporting surface whereby the stored hitch ball assembly is not likely to impact the supporting surface during storage. This feature will protect both the hitch ball assembly and the surfaces of the storage area adjacent to the stored hitch ball assembly. This is an especially valuable feature if the storage unit is located in a motor vehicle which is subject to bouncing, acceleration and deceleration forces that might cause the stored hitch ball assembly to impact a surface near the stored hitch ball assembly. However, this is also a valuable feature even if the storage assembly is mounted on a wall or the like since insertion or removal of the hitch ball assembly into or from housing 60 will be easier if bore 50 is spaced apart from the supporting surface. This also reduces the possibility of the hitch ball assembly contacting, and hence damaging, the supporting surface during insertion or removal to or from bore 50. Further, since the channel stops short of housing end 74, wall portion 112 is spaced apart from the supporting surface so the receiver pin can extend completely through the housing, the bore and the support bar 24 to securely attach the support bar to the housing.

As can be seen in the figures, housing 60 can further include two aligned receiver pin accommodating holes 150 and 152 respectively defined through walls 90 and 92 of the housing so a receiver pin, similar to receiver pin 140, can be inserted into bore 50 and through hole 40 defined through support bar 24 so the hitch pin assembly can be oriented 90° with respect to the orientation shown in the figures if suitable. This provides versatility to unit 10.

It is understood that while certain forms of the present invention have been illustrated and described herein, it is not to be limited to the specific forms or arrangements of parts described and shown.

What is claimed is:

1. A storage unit for storing a trailer hitch assembly comprising:

a housing which is mounted on a support element to store a hitch assembly, the hitch assembly including a support bar having a hitch ball mounted on one end thereof, a receiver pin accommodating hole defined through the support bar and a receiver pin, the housing including (1) a tubular body having a first end, a second end and a longitudinal axis extending between the first end of the tubular body and the second end of the tubular body, (2) a bore extending in the direction of the longitudinal axis and extending between the first end of the tubular housing and the second end of the tubular housing, the bore being sized and shaped to slidably accommodate the support bar of the hitch assembly, (3) a first side wall, (4) a second side wall, (5) a third side wall connecting the first side wall to the second side wall, having a receiver pin accommodating hole defined therethrough and a fastener accommodating hole defined therethrough, (6) a fourth side wall connecting the first side wall to the second side wall, the fourth side wall being in facing relationship with the third side wall, the fourth side wall further including (a) a first wall having a first end and a second end which is spaced apart from the second end of the tubular body in the direction of the longitudinal axis of the tubular body, (b) a second wall having a first end and a second end which is spaced apart from the second end of the tubular body in the direction of the longitudinal axis of the tubular body, (c) a third wall connecting the first wall of the fourth side wall to the second wall of the fourth side wall, the third wall having a mounting fastener accommodating hole defined therethrough, the mounting fastener accommodating hole in the third wall being aligned with the fastener accommodating hole defined through the third side wall of the housing, (d) the first wall of the fourth side wall and the second wall of the fourth side wall being spaced apart from each other and defining a channel therebetween, the channel being oriented and located to open into the bore of the housing, and (e) a fifth wall portion located between the second ends of the first and second walls of the fourth wall and the second end of the tubular body, there being a spacing between the channel of the fourth wall and the second end of the tubular body, the fifth wall portion having a receiver pin accommodating hole defined therethrough, the receiver pin accommodating hole in the fifth wall portion being aligned with the receiver pin accommodating hole defined through the third side wall of the housing, the receiver pin of the hitch assembly being accommodated through the aligned receiver pin accommodating holes defined through the first wall of the housing and the fifth wall portion of the fourth wall of the housing when the hitch assembly is accommodated in the tubular body of the housing.

2. A storage unit for storing a trailer hitch assembly comprising:

a housing which is mounted on a support element to store a hitch assembly, the hitch assembly including a support bar having a hitch ball mounted on one end thereof, a receiver pin accommodating hole defined through the support bar and a receiver pin, the housing including (1) a tubular body having a first end, a second end and a longitudinal axis extending between the first end of the tubular body and the second end of the tubular body, (2) a bore extending in the direction of the longitudinal axis and extending between the first end of the tubular housing and the second end of the tubular housing, the bore being sized and shaped to slidably accommodate the support bar of the hitch assembly, (3) a first side wall, (4) a second side wall, (5) a third side wall connecting the first side wall to the second side wall, having a receiver pin accommodating hole defined therethrough and a fastener accommodating hole defined therethrough, (6) a fourth side wall connecting the first side wall to the second side wall, the fourth side wall being in facing relationship with the third side wall, the fourth side wall further including (a) a first wall having a first end that is co-planar with the first end of the tubular body and a second end which is spaced apart from the second end of the tubular body in the direction of the longitudinal axis of the tubular body, (b) a second wall having a first end that is co-planar with the first end of the tubular body and a second end which is spaced apart from the second end of the tubular body in the direction of the longitudinal axis of the tubular body, the second end of the second wall being coplanar with the second end of the first wall, (c) a third wall connecting the first wall of the fourth side wall to the second wall of the fourth side wall, the third wall having a mounting fastener accommodating hole defined therethrough, the mounting fastener accommodating hole in the third wall being aligned with the fastener accommodating hole defined through the third side wall of the housing, (d) the first wall of the fourth side wall and the second wall of the fourth side wall being essentially parallel to each other and spaced apart from each other and defining a channel therebetween, the channel being oriented and located to open into the bore of the housing, and (e) a fifth wall portion located between the second ends of the first and second walls of the fourth wall and the second end of the tubular body, there being a spacing between the channel of the fourth wall and the second end of the tubular body, the fifth wall portion having a receiver pin accommodating hole defined therethrough, the receiver pin accommodating hole in the fifth wall portion being aligned with the receiver pin accommodating hole defined through the third side wall of the housing, the receiver pin of the hitch assembly being accommodated through the aligned receiver pin accommodating holes defined through the first wall of the housing and the fifth wall portion of the fourth wall of the housing when the hitch assembly is accommodated in the tubular body of the housing.

3. The storage unit defined in claim 1 wherein the first side wall of the tubular body includes a receiver pin accommodating hole defined therethrough.

4. The storage unit defined in claim 3 wherein the second side wall of the tubular body includes a receiver pin accommodating hole defined therethrough, the receiver pin accommodating hole in the second side wall being aligned with the receiver pin accommodating hole defined through the first side wall.

5. The storage unit defined in claim 1 wherein the third wall of the tubular body further includes a second fastener accommodating hole defined therethrough.

6. The storage unit defined in claim 1 further including a cotter pin which is adapted to fit onto the second end of the tubular housing.

7. The storage unit defined in claim 1 further including a stiffening rib on the fourth side wall connecting the fourth side wall to the first wall of the fourth side wall.

8. The storage unit defined in claim 1 further including a stiffening rib on the fourth side wall connecting the fourth side wall to the second wall of the fourth side wall.

* * * * *